L. P. CARLE.
CIRCUIT TESTING APPARATUS.
APPLICATION FILED MAY 27, 1918.

1,395,037.

Patented Oct. 25, 1921.
2 SHEETS—SHEET 1.

Inventor
Leon. P. Carle

By Mason Fenwick & Lawrence,
Attorneys

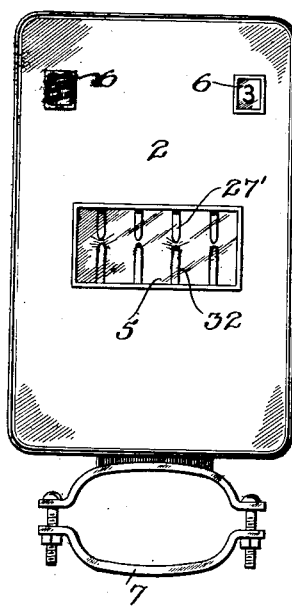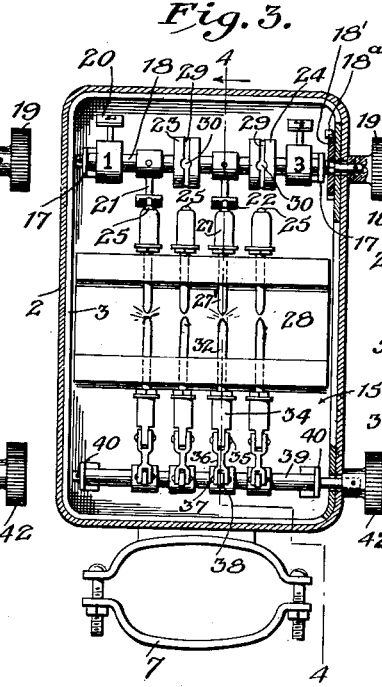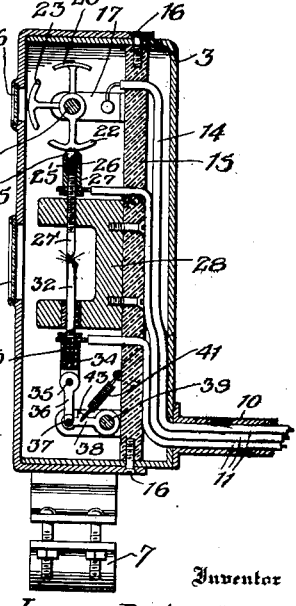

UNITED STATES PATENT OFFICE.

LEON PERCY CARLE, OF NORTH RAYMOND, MAINE.

CIRCUIT-TESTING APPARATUS.

1,395,037.  Specification of Letters Patent.  Patented Oct. 25, 1921.

Application filed May 27, 1918. Serial No. 236,889.

*To all whom it may concern:*

Be it known that I, LEON P. CARLE, a citizen of the United States, residing at North Raymond, in the county of Cumberland and State of Maine, have invented certain new and useful Improvements in Circuit-Testing Apparatus; and I do hereby declare the following to be a full, clear, and exact description of the invention, such as will enable others skilled in the art to which it appertains to make and use the same.

This invention relates to apparatus for testing the electrical ignition circuits of internal combustion engines, and has for its object to provide for the ready detection of trouble either with the spark plugs or the coils of the apparatus and for assistance in the location of the trouble if it is not at either of these elements. It is a further object of the invention to provide a device of this type which may be readily connected with the usual electrical ignition system of internal combustion engines and which will include means for readily indicating to the attendant which of the plugs or coils are being tested. It is another object of the invention to provide means for separately testing the spark plugs from the sparking coils or distributer and to provide a testing device having an indicating and operating device readily attachable to the steering post or other convenient support or place of mounting, especially when the apparatus is to be utilized for automobile engines.

It is another object of the invention to provide a spark coil and plug testing device comprising parts simple and inexpensive in construction and which may be readily renewed or replaced and in which various of the parts are interchangeable, and further to provide a device of this type which is simple in operation, durable, efficient and reliable.

Referring to the drawings which show one embodiment of my invention, in which I have shown the connection and arrangement for use with a four cylinder engine, Figure 1 is a diagrammatic plan thereof;

Fig. 2 is a front elevation;

Fig. 3 is a front elevation partly in section, and,

Fig. 4 is a section on the line 4—4 of Fig. 3.

Figure 1:
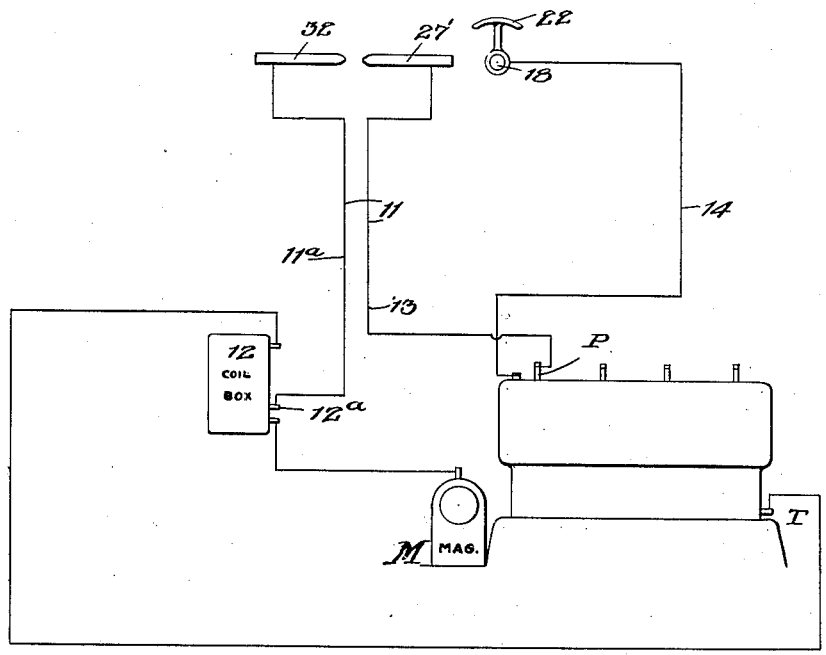

In the illustrated embodiment of the invention, the apparatus is shown as comprising a box or sectional casing having a top section 2 adapted to telescope down over the upstanding sides of the lower casing or section 3, the box in the present instance being shown as substantially oblong in form, and having at the central portion of the cover 2 a window 5 of suitable proportions. The cover section 2 is also provided with small windows 6. While the box thus described may be readily mounted in any suitable manner and at any desired location on the vehicle, in this illustration of the invention the top section 2 of the box is provided with a split clamp device 7 at one end, adapted to encompass and be fastened upon the tubular steering post of an automobile where it may be conveniently reached for the operation of its switches and plainly in view of the operator.

Within the lower section of the casing there is mounted an insulating base or support 15 which may be fastened in position by means of screws 16 passing through the flange of the casing section 2 and the flange of the section 3, though obviously the base block 15 may be secured otherwise in any suitable manner. Fastened on the base 15 on a line with the windows 6—6 of the casing 2 is a pair of bearing brackets 17, in the upstanding arms of which is journaled a spindle 18 which projects through the telescoped casings and is provided on one side with a knob 19 whereby it may be turned, and to one of these brackets the ground wire 14 is shown as connected. This spindle 18 is adapted to be turned in one direction only, reverse movement being prevented by a ratchet wheel 18' secured thereon and engaged by a yielding pawl 18ᵃ, these parts being shown in Fig. 3. Secured adjacent the ends of the spindle 18 so as to rotate in planes passing through the windows 6, are suitable indicating members 20, one pair of which are arranged as shown in Fig. 3 on one side of the spindle 18, and are designated with the numerals "1" and "3," and at a quarter turn in the same peripheral line there is also provided a further set of index numbers which are designated as "2" and "4," these numbers being relative to similarly designated cylinders of the engine so that by the turning of the spindle 18 through means of the knob 19, either the index numerals "1" and "3" will be presented at the windows, or the numerals "2" and "4" obviously indicating respective spark plugs and coils being connected for testing in the circuit of the apparatus.

Intermediately between the index members 20 there is secured on the spindle a pair of contact members 21 and 22 respectively for the index number "1" and the index number "3," these being alined longitudinally on one side of the shaft and at a quarter turn in advance of a similar set of contact members 23 and 24, all of which are in the form of segments of annulæ, these segments having hubs secured on the spindle 18. Each of these contact members 21, 22, 23, and 24 is adapted to be brought into contact with respective yielding contacts shown as each comprising a ball 25, reacted upon by a spring 26, supported in a socket 25' which limits the outward movement of the ball and which has a contact member 27', which is adjustably secured in a transversely disposed insulating bridge 28, having upstanding bearings at its sides to receive different contact members of the device. As shown, the several sockets 27 are arranged in the plane passing through and parallel with the axis of the spindle 18, and, if desired, the outer circular faces of the contact segments may be peripherally grooved as at 29 to receive the balls, and preferably the central portions of the grooves are provided with circular depressions 30, in which the balls may seat firmly when the respective contact members are brought into register therewith.

Arranged in the upstanding bearings of the bridge 28 and in the same plane with and alining with the contact 27' of the sockets 27, there is a series of movable contact members 32 which are threaded as at 33 to be entered into threaded insulating bearings 34, which are pivotally connected at 35 to links 36, which in turn are pivoted at their opposite ends 37 to respective levers 38, secured upon a rocker shaft or spindle 39 mounted in bearings 40 secured to the base 15, the shaft extending parallel to the spindle 18.

The contact members 32 are normally in engagement with the contact members 27' by means of a tension spring 41 secured at one end to one of the levers 38 and at the other the insulator base 15. To separate the contact members 32 and 27' the shaft 39 is rotated by means of a knob 42 secured to its outer end, excessive separation being prevented by means of lugs 43 which are adapted to engage the links 36 after the shaft has been rotated through a predetermined angle.

In Fig. 1 in which a single diagrammatic circuit is shown it will be readily seen in just what manner the contacts 32 and 27' are introduced to the ordinary ignition circuit. Current normally passes from the magneto M to the coil, thence through wire 11ª, connected to the usual binding post 12ª on the coil, to the contact 32 thence through contact 27' and wire 13 to the spark plug P the circuit being completed in the usual manner. If, however, the shaft 18 be rotated to bring the members 22 into connection with the contact 27' then the current, instead of passing through 13 to the plug P is grounded through wire 14 electrically connected to the shaft 18 and the engine.

In operation the contact members 32 are withdrawn from the contact members 27', as shown in Fig. 2 by turning the shaft 39 by means of knob 42. If the coils and spark plugs are operating correctly sparks will be formed at each of the gaps in the order of firing cylinders and at regular intervals. If in one or more gaps no spark is visible it indicates that either the coil or the spark plug is out of working order. By turning the knob 19 until the number of the missing cylinder is shown at one of the small windows 6 its contact member 21, 22, 23 or 24, as the case may be, is thrown into electrical connection with its contact member 27' and the circuit for the cylinder is grounded. If a spark is now visible it indicates that the trouble lies in the spark plug or the wiring connection between it and its contact member 27'. If, however, no spark is seen it indicates that the trouble lies between the magneto and the contact member 32, probably in the coil.

What I claim is:

1. In a device for testing the ignition circuits of internal combustion engines, an insulating base, a contact member secured to said base and connected to a spark plug, a spring advanced contact member also carried by said base and connected to a source of current supply, said spring advanced contact member engaging said first mentioned contact member, means for withdrawing said contact member to produce a spark gap and means for short circuiting the first mentioned contact member from the plug.

2. In a device for testing the ignition circuits of internal combustion engines, having the usual spark plugs and source of electrical supply, an insulating base, an adjustable contact member secured to said base and connected to a spark plug, a spring advanced contact member engaging said first mentioned contact member and connected to the source of electrical supply, a rock shaft, an arm secured to said rock shaft, and a link connecting said arm and said spring advanced contact member.

3. In a device for testing the ignition circuits of internal combustion engines, having the usual spark plugs and source of electrical supply, an insulating base, an adjustable contact member secured to said base and connected to a spark plug, a spring advanced contact member engaging said first mentioned contact member and connected to the source of electrical supply, a rock shaft, an arm secured to said rock shaft, a link connecting said arm and said spring advanced contact member and a lug on said arm adapted to engage said link.

4. A device for testing electric ignition circuits of internal combustion engines, comprising a series of contacts connected to a series of spark plugs and second series of contacts connected to the coils thereof and whereby an individual spark gap may be produced for each plug, and means coöperative therewith for short circuiting the current from the plugs to test the coils, said second series of contacts being movable and means for yieldingly holding them in closed relations.

5. A device for testing electric ignition circuits of internal combustion engines, comprising means connectible to a series of spark plugs and to the coils thereof and whereby an individual spark gap may be produced for each plug, and means coöperative therewith for short circuiting the current from the plugs to test the coils, the first named means including a series of fixed contacts, a series of movable contacts engageable therewith, a rock shaft connected to the movable contacts.

6. A device for testing electric ignition circuits of internal combustion engines, comprising means connectible to a series of spark plugs and to the coils thereof and whereby an individual spark gap may be produced for each plug, and means coöperative therewith for short circuiting the current from the plugs to test the coils, the first named means including a series of fixed contacts, a series of movable contacts engageable therewith, a rock shaft connected to the movable contacts, and means for normally holding the contact series closed.

7. A device for testing electric ignition circuits of internal combustion engines, comprising fixed contacts connectible to a series of spark plugs and movable contacts engaging said fixed contacts and connected to the coils whereby an individual spark gap may be produced for each plug, and means cooperative therewith for short circuiting the current from the plugs to test the coils, a rock shaft connected to the movable contacts, said short circuiting means comprising a grounded rock shaft having a plurality of wipers to selectively engage the fixed contacts.

8. A device for testing electric ignition circuits of internal combustion engines, comprising relatively adjustable contacts connected to a series of spark plugs and coils respectively, whereby individual spark gaps may be produced for each plug, and short circuiting means comprising a grounded rock shaft, a plurality of wipers thereon adapted to selectively engage the spark plug contacts and ground the same, and indicators mounted on said rock shaft corresponding to said wipers.

In testimony whereof I affix my signature.

LEON PERCY CARLE.